US 6,722,217 B2

(12) United States Patent  
Wafzig

(10) Patent No.: US 6,722,217 B2  
(45) Date of Patent: Apr. 20, 2004

(54) VEHICLE TRANSMISSION

(75) Inventor: Jürgen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/209,791

(22) Filed: Jul. 31, 2002

(65) Prior Publication Data

US 2003/0074991 A1 Apr. 24, 2003

(30) Foreign Application Priority Data

Jul. 31, 2001 (DE) .......................... 101 37 356

(51) Int. Cl.7 ................................................ F16H 3/08
(52) U.S. Cl. ........................................ 74/329; 74/331
(58) Field of Search .................. 74/329, 331, 333, 74/335, 339

(56) References Cited

U.S. PATENT DOCUMENTS

| | | | |
|---|---|---|---|
| 3,859,870 A | * | 1/1975 | Whateley ........................ 74/745 |
| 4,252,223 A | * | 2/1981 | Morscheck ................ 192/53.332 |
| 4,614,126 A | | 9/1986 | Edelen et al. ................... 74/333 |
| 4,876,924 A | * | 10/1989 | Fletcher et al. ................. 74/745 |
| 5,363,712 A | | 11/1994 | Müller .......................... 74/337.5 |
| 5,388,472 A | * | 2/1995 | Alfredsson ...................... 74/331 |
| 6,530,290 B2 | * | 3/2003 | Matsufuji et al. .............. 74/335 |

FOREIGN PATENT DOCUMENTS

| | | | | |
|---|---|---|---|---|
| DE | 42 05 670 C1 | 6/1993 | ............ | F16H/63/16 |
| DE | 44 29 546 A1 | 2/1996 | ............. | F16H/3/16 |
| EP | 0 625 652 A1 | 5/1994 | ............ | F16H/3/095 |
| EP | 0 882 908 A2 | 12/1998 | ............ | F16H/3/091 |
| FR | 2 787 855 | 6/2000 | ............ | F16H/57/02 |
| GB | 681759 | 10/1952 | | |
| JP | 60065941 A | * 4/1985 | ............. | F16H/3/08 |
| JP | 60245856 A | 12/1985 | ............. | F16H/5/12 |
| JP | 10231904 A | 9/1998 | ............ | F16H/3/091 |

OTHER PUBLICATIONS

Looman, Dr.–Ing. Johannes, "Zahnradgetriebe"—Grundlagen und Konstruktion der Vorgelege– und Planetenradgetriebe, Springer–Verlag, Berlin, Germany, 1970, pp 181–184.

* cited by examiner

Primary Examiner—Tisha D Lewis  
(74) Attorney, Agent, or Firm—Davis & Bujold, P.L.L.C.

(57) ABSTRACT

A transmission for a vehicle with an input drive shaft (10), a coaxial output drive shaft (11) and a counter shaft (12, 13) which is installed axis-parallel to the input and output shafts (10, 11) and can be driveably connected with the input and output shafts (10, 11) by gear sets (I to V and W) and shifting clutches (a to e, g, h), whereby certain gear sets (I, II, III, W) form a principal gear-drive group (29) and two gear sets (IV, V) form a range group (30) located proximal to the output shaft (11). The proposal is that between the input drive shaft (10) and the output drive shaft (11) a coaxial intermediate shaft (14) is located, in which a first shifting clutch (a) can connect the intermediate shaft (14) to the input drive shaft (10) and a sixth shifting clutch (f) can connect the intermediate shaft (14) with the output shaft (11). The counter shaft (12, 13) comprises a first counter shaft (12) and a second counter shaft (13), coaxial aligned therewith, which can be coupled with the first counter shaft (12) by a second shifting clutch (b).

4 Claims, 2 Drawing Sheets

| Gear set | i |
|---|---|
| I | 1,38 |
| II | 2,39 |
| III | 3,15 |
| IV | 0,35 |
| V | 1,05 |
| W | 2,90 |

Fig. 2

| Clutch ⇒ Gear ⇓ | a | b | c | d | e | f | g | h | u | φ |
|---|---|---|---|---|---|---|---|---|---|---|
| 1 | • |   | • | • |   |   |   |   | 9,00 |   |
| 2 | • | • |   | • |   |   |   |   | 6,83 | 1,32 |
| 3 |   |   | • | • |   |   |   | • | 5,20 | 1,31 |
| 4 |   | • |   | • |   |   |   | • | 3,94 | 1,32 |
| 5 | • |   | • |   | • |   |   |   | 3,00 | 1,31 |
| 6 | • | • |   |   | • |   |   |   | 2,28 | 1,32 |
| 7 |   |   | • |   | • |   |   | • | 1,73 | 1,32 |
| 8 |   | • |   |   | • |   |   | • | 1,31 | 1,31 |
| 9 | • |   |   |   |   | • |   |   | 1,00 | 1,32 |
| R | • |   |   | • |   |   | • |   | 8,29 |   |

Fig. 3

VEHICLE TRANSMISSION

FIELD OF THE INVENTION

The invention concerns a vehicle transmission.

BACKGROUND OF THE INVENTION

Vehicle transmissions constructed in the countershaft gear train mode, from a standpoint of design and price, are very favorably looked upon as a selection for installation. These transmissions, as a rule, possess both an input and an output drive shaft, as well as a counter drive shaft parallel to the said shafts. The flow of force is conducted over a first gear set from the input drive shaft onto the counter shaft, and from there, by means of a second gear set to the output shaft. One of the said gear sets, which takes part in all gears and is known as a "constant", possesses two fixed gears, which mesh together and are seated at any given time on the counter shaft, the input shaft or the output shaft. The other gear set possesses an idler gear and a fixed gear. This set is normally assigned to one gear stage. The gear set for reverse action, i.e., the reverse gearing, possesses an intermediate gear, which, first, meshes with the idler gear and second, with the fixed gear, and thus the direction of rotation of the output shaft as opposed to the input shaft is reversed.

For the direct through-drive, unimpeded through the transmission, which corresponds to a gear ratio of one, the input drive shaft is coupled, by means of a shift-clutch directly with the coaxially aligned output shaft, without carrying any torque by means of gear sets. In this case, a vehicle transmission, that has six forward drives, of which one serves as a direct gear, and with one reverse gear requires six gear sets and seven shifting clutches. The shifting clutches in the vehicle transmission, as a rule, are of such design that they can be activated, one after the other, by the driver through mechanical activation elements, since the driver operates a manual shift lever in two mutually perpendicularly arranged planes of motion.

By means of a movement in the first motion plane, two gears of a shift sequence are selected, and by means of a movement in the second motion direction another of the chosen gears is shifted. In order to be able to drive a vehicle motor during travel in an optimal operational zone, transmissions with many gear stages are desirable, whereby the stage jumps between the individual gears, from the highest to the lowest gears, should progressively climb from the highest gear to the lowest gear. What is achieved by this is, that the driver, by a fine incrementation of the speed of rotation of the vehicle motor, can very well suit the vehicle speed. Further the entire gear ratio range of the vehicle transmission, between the first and the highest gears should be large, whereby the ratio of the gear ratio range to the number of the gear stages is relatively large and expense can be held at a minimum. Such vehicle transmissions permit, at a justifiable expense, the use of up to six forward gear stages.

The cost of construction of a vehicle transmission can be reduced, in that some gear sets can be employed in multi use, in which they are put to use for the formation of different gear stages. By way of example, in the case of the group drives of a principal gear-drive group, an auxiliary gear-drive group, consisting of two or more gear sets is installed either leading or trailing, so that from the combination of the gear sets of the auxiliary gear-drive groups with the gear sets of the principal gear-drive groups, the number of the gear stages of the vehicle transmission can be obtained from the product of the number of the gear stages of the individual drive groups. The gear stage jumps between the gear sets of the auxiliary gear-drive group are so attuned to the stage jumps between the gear set groups of the principal transmission, that, all in all, there is created a useable gear staging of the vehicle transmission. Because of the group assembly mode of the vehicle transmission, in general, only a geometric, but not a progressive staging of the entire gear ratio range is possible, since, by the multiple use of the gear sets of the principal gear-drive group, the stage jumps of the said principal gear-drive repeat themselves multiple times.

The auxiliary gear-drive group is, as a rule, so designed, that, operating as a so-called split transmission group, it subdivides the stage jumps of the principal gear-drive group or functions as the so-called range drive group, and extends the ratio range of the principal gear group upward or downward. While the principal gear group, as a rule, is laid out in such a manner, that it can be shifted manually with mechanical means, the auxiliary gear-drive group is activated by outside force, i.e., electrical, hydraulic, or pneumatic. Such group transmissions are known for drives with eight and more gears as described in "Construction Book Vol. 26, Loomann, "Toothed Gear Transmissions", 1970 Springer Verlag, Berlin, pages 181, ff.

DE 42 05 670 C1 disclosed a vehicle transmission constructed in accord with the auxiliary assembly mode, in which, with five gear sets, a total of six forward gears, including one direct gear, and one reverse gear have been realized. This is brought about, in that an centrally placed gear set is in multiple use, since the said gear set can be connected for one thing, to the input drive shaft, and for another, to the output drive shaft. The number of the gears can, when desired, be increased by two gears, by adding one additional gear set. This kind of a "wrap-around" transmission does not permit itself to be shifted in a logical shift pattern by customary mechanical hand shift apparatuses. In any case, this is not an obstructive condition, as the clutch for shifting can be activated by external power means.

The purpose of the invention is to create a vehicle transmission with nine forward gears and one reverse gear, with said transmission having a low manufacturing cost.

SUMMARY OF THE INVENTION

In accord with the invention, in the case of the vehicle transmission, between the input drive shaft and the output drive shaft is placed a coaxial intermediate shaft. This intermediate shaft can be engaged by means of a first shifting clutch with the input drive shaft, and by a sixth shifting clutch with the output shaft. The counter shaft is subdivided into a first counter shaft and into second, counter shaft, placed coaxial to the first, which can be engaged with the first counter shaft by means of a second shifting clutch. The first to the third gear set and the reverse set form a principal gear-drive, whereby a first fixed gear of the first gear set is seated on the input drive shaft and meshes with a first idler gear on the first counter shaft. A second, fourth and seventh fixed gear of the second and third gear set, as well as the reverse gear set are seated on an intermediate shaft, wherein the second fixed gear meshes with a third fixed gear on the first counter shaft while the third fixed gear drives a second idler gear and the seventh fixed gear, by means of an intermediate gear, drives a fifth idler on the second counter shaft. The fourth and fifth gear sets, which form a range group on the output side, possess a fifth fixed gear, respectively, a sixth fixed gear on the output drive shaft, which mesh with the idler gears on the second counter shaft.

With the aid of an appropriate shifting logic, it now becomes possible to realize the construction of a vehicle transmission with nine shift stages at the same manufacturing cost of a vehicle transmission in the group construction mode having six shift stages. This makes possible both smaller gear shift jumps and a greater spread of the vehicle transmission. By means of the multi-use of some gear groups, the possibility exists that a total of six gear sets and eight shift-couplings will suffice. These must all, in any event, be shifted by external forces, which, in this day of the actuator technology presents no particular difficulty. Because of this fact, such transmissions can be equipped in a simple manner to bring about automatically shifting vehicle transmissions.

An advantageous shifting logic arises, when, for the formation of a first to a fourth gear stage, the flow of force is directed through the fourth gear set, and for the formation of a fifth to eighth gear stage, the flow of force is directed through the fifth gear set. Besides this, the flow of force in the first and fifth gear set is led over the third gear set, in the second and sixth gear set, through the second gear set, in the third and seventh step, through the first gear set, and in the fourth and eighth through the first, second and third gear set. In a ninth, direct gear position, the input drive the input drive shaft, by means of the intermediate shaft, and by the first and second shifting clutches is connected to the output shaft. A reverse gear position, is advantageously fashioned, in accord with a desired gear ratio, through the reverse gear set and the fourth or fifth gear set, through which the flow of force is conducted.

With advantageous gear ratios, the gear sets, for example, for the first gear set about 1.38, for the second gear set a value of 2.39, for the third gear set, 3.15, for the fourth gear set 0.35 for the fifth gear set 1.05 and for the reverse gear set of 2.90, there is a transmission spread of 9.00 between a transmission ratio in the first gear position of 9.00 to a transmission ratio of 1.00 in the ninth gear. Thus the gear stage jump, between the individual steps is geometric with a factor of about 1.31.

BRIEF DESCRIPTION OF THE DRAWINGS

The invention will now be described, by way of example, with reference to the accompanying drawings in which:

FIG. 2 A tabulated summary of individual ratios of gear sets; and

FIG. 3 A shift diagram for a vehicle transmission in accord with FIG. 1.

DETAILED DESCRIPTION OF THE INVENTION

Figure 1:
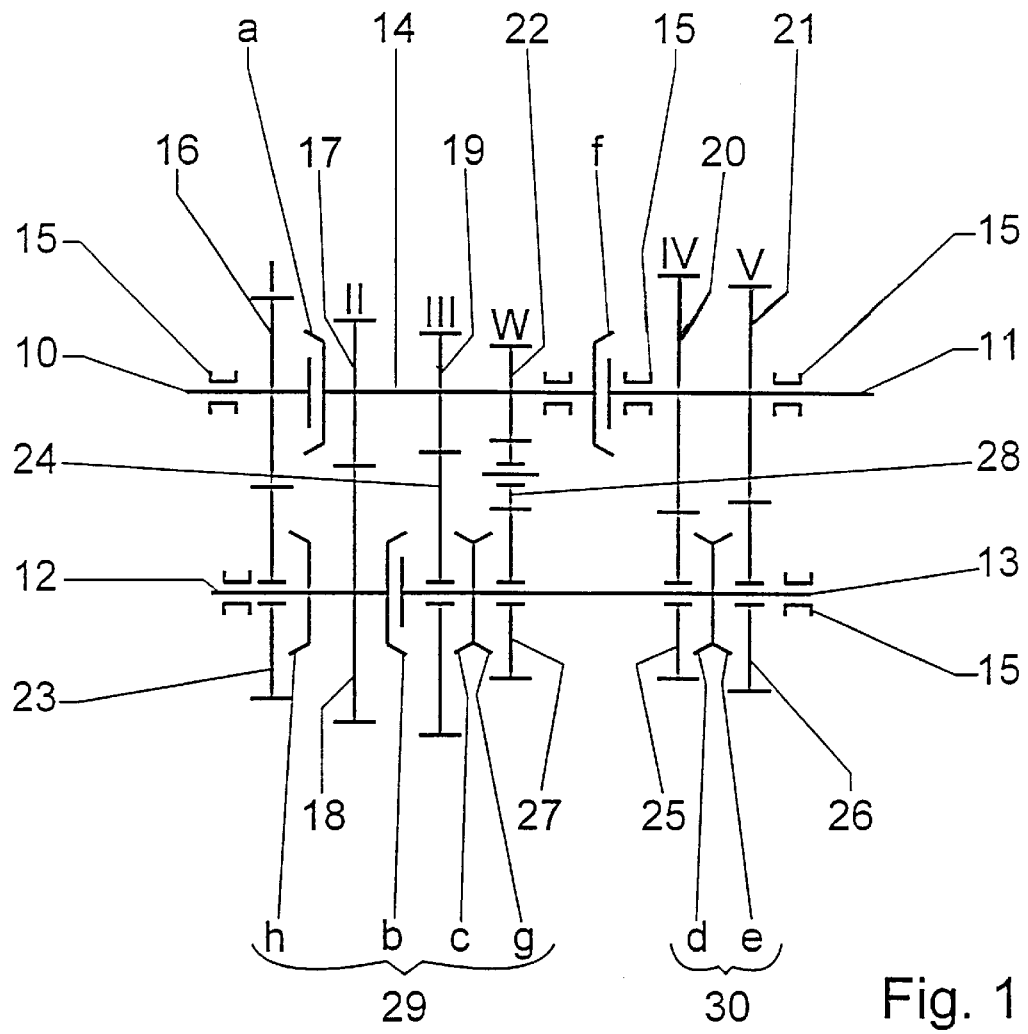
FIG. 1 A transmission scheme of an invented vehicle transmission.

The vehicle transmission in accord with FIG. 1 possesses an input drive shaft 10 and an output shaft 11 coaxially aligned thereto. Again coaxially aligned to both said shafts and located between them, is placed an intermediate shaft 14, which, by means of a first shifting clutch a can be engaged with the input drive shaft 10, and by means of a sixth shifting clutch f can be engaged with the output shaft 11.

Parallel to the input drive shaft 10 is a first counter shaft 12 and, axially aligned thereto, a correlated second counter shaft 13 is provided. All shafts, 10, 11, 12, 13, and 14 are borne in bearings 15, in a transmission housing, which is not further described. On the input drive shaft 10 is seated a first fixed gear 16, which meshes with the first idler gear 23, which is carried on the first counter shaft 12 and this, along with the first fixed gear 16, forms the first gear set I. A second gear set II is assembled by a second fixed gear 17 on the intermediate shaft 14 and a third fixed gear 18 on the first counter shaft 12. A third gear set III possesses a fourth fixed gear 19 on the intermediate shaft 14 and a second idler gear on the second counter shaft 13, while a reverse gearing W has a seventh fixed gear 22 on the intermediate shaft 14, which, by means of an intermediate gear 28 is engaged in a drive manner with a fifth idler gear 27 on the second counter shaft 13. The first to the third gear sets, namely I, II, III, and the reverse gearing W forms a principal gear-drive group 29. Following this is a range gear-drive group 30, which encompasses a fourth gear set IV and a fifth gear set V. A fifth fixed gear 20 of the fourth gear set IV and a sixth fixed gear 21 of the fifth gear set V are seated on the output shaft 11. The fifth fixed gear 20 meshes with a third idler 25, and the sixth gear with a fourth idler 26 on the second counter shaft 13.

The first counter shaft 12 can be coupled together with the second counter shaft 13 by means of a second shifting clutch b. Further, on the first counter shaft 12 an eighth shifting clutch h is placed, by means of which the first idler gear 23 of the first gear set I can be engaged with the first counter shaft 12. A third, fourth, fifth and seventh shifting clutches, namely, c, d, e and g, if desired, can engage the remaining idler gears 24, 25, 26 and 27 with the second counter shaft 13.

The gear sets I to V and the reverse set W are shown in the table of FIG. 2 with the associated gear ratios i, wherein the first gear set I has a ratio of 1.38, the second gear set II is listed at a ratio of 2.39, the third gear set III reads 3.15, the fourth gear set IV shows a ratio of 0.35, the fifth gear set has a ratio of 1.05 and the reverse gear set W is listed at 2.9. In this tabulation, the ratio i is to be understood as the ratio of the number of teeth on the gear on the first or second counter shaft 12, 13, divided by the number of teeth of the corresponding gear on the shafts for input drive, intermediate drive or output drive, namely 10, 14, 15 respectively.

FIG. 3 shows the applied shifting logic. In a first to a fourth gear stage, i.e., 1, 2, 3, 4, the fourth shifting clutch d is closed, so that the flow of force to the output shaft 11 is conducted over the fourth gear set IV. In the following fifth to the eighth gear 5, 6, 7, 8 the fifth shifting clutch e is closed, so that the flow of force is now conducted through the fifth gear set V to the output shaft 11. Additionally to the fourth and fifth shifting clutches d, e, which shift the range gear-drive group 30, in the first and fifth gear 1, 5, the first and third shift gear a, c are activated; in the second and sixth gear 2, 6, the first and second shifting clutch a, b; in the third and seventh gear, 3, 7 the third and eighth shifting clutch c, h; in the fourth and eighth gear 4, 8 the second and eighth shifting clutch b, h. Thereby, additionally in the first and fifth gear 1, 5, the flow of force is directed through the third gear set III, in the second and seventh gear 2, 6 through the second gear set II and in the fourth and eighth gear 4, 8 through the first gear set I. In the third and seventh gear 3, 7 the third shifting clutch c and the eighth shift coupling h is closed. Thereby the flow of force from the input drive shaft 10 is conducted first over the first gear set I to the first counter shaft 12, thereafter, by means of the second gear set II onto the intermediate shaft 14 and from there over the third gear set III to the second counter shaft 13. In the ninth gear 9, the first shifting clutch a and the sixth shifting clutch f are closed, so that the input drive shaft 10 is coupled by a clutch through the intermediate shaft 14 with the output shaft 11, without conducting any torque through the gear set I to V and W. Finally, in the reverse gear R, the first shifting clutch a, the seventh shifting clutch g and the fourth shifting clutch d are closed, so that the flow of force runs through the reverse gear set W, which, because of the intermediate gear 28, the direction of rotation of the output shaft 11, as compared to the input shaft 10, is reversed.

The described shifting logic yields, in connection with the gear ratios of FIG. 2, a gear ratio u corresponding to the next-to-last column in FIG. 3, and, indeed, in the gears as follows: in the

| first gear 1 | ratio is | 9.00 |
| second gear 2 | ratio is | 6.83 |
| third gear 3 | ratio is | 5.20 |
| fourth gear 4 | ratio is | 3.94 |
| fifth gear 5 | ratio is | 3.00 |
| sixth gear 6 | ratio is | 2.28 |
| seventh gear 7 | ratio is | 1.73 |
| eighth gear 8 | ratio is | 1.31 |
| ninth gear 1 | ratio is | 1.00 and finally, the |
| reverse gear R | ratio is | 8.29. |

From this there arises an essentially geometric transmission staging with a stage jump $\phi$ for the forward gears 1 to 9 of some 1.32, corresponding to the last column in FIG. 3.

| Reference Numbers and Components | |
|---|---|
| 1 | first gear |
| 2 | second gear |
| 3 | third gear |
| 4 | fourth gear |
| 5 | fifth gear |
| 6 | sixth gear |
| 7 | seventh gear |
| 8 | eighth gear |
| 9 | ninth gear |
| 10 | input shaft |
| 11 | output shaft |
| 12 | first counter shaft |
| 13 | second counter shaft |
| 14 | Intermediate shaft |
| 15 | bearing |
| 16 | first fixed gear |
| 17 | second fixed gear |
| 18 | third fixed gear |
| 19 | fourth fixed gear |
| 20 | fifth fixed gear |
| 21 | sixth fixed gear |
| 22 | seventh fixed gear |
| 23 | first idler gear |
| 24 | second idler gear |
| 25 | third idler gear |
| 26 | fourth idler gear |
| 27 | fifth idler gear |
| 28 | intermediate gear |
| 29 | Principal gear-drive group |
| 30 | Range gear-drive group |
| I | first gear set |
| II | second gear set |
| III | third gear set |
| IV | fourth gear set |
| V | fifth gear set |
| W | reverse gear set |
| a | first shifting clutch |
| b | second shifting clutch |
| c | third shifting clutch |
| d | fourth shifting clutch |
| e | fifth shifting clutch |
| f | sixth shifting clutch |
| g | seventh shifting clutch |
| h | eighth shifting clutch |
| u | Transmission gear ratio |
| i | gear ratio |
| $\phi$ | Stage jump |

What is claimed is:

1. A transmission for vehicles comprising:
an input drive shaft (10), a coaxial output shaft (11), and a counter shaft (12, 13) which is situated on an axis parallel to those of the input and output shafts (10, 11) and can be connected to and driven by the input shaft (10) by gear sets (I to V and W) and shifting clutches (a to e, g, h), whereby certain gear sets (I, II, III, W) form a principal gear-drive group (29) and two gear sets (IV, V) form a range gear-drive group (30) situated proximal to the output shaft (11), wherein a coaxial intermediate shaft (14) is placed between the input drive shaft (10) and the output drive shaft (11) which, by means of a first shifting clutch (a) can be coupled with the input drive shaft (10) and by means of a sixth shifting clutch (f) can be coupled with the output shaft (11);
the counter shaft (12, 13) comprises a first counter shaft (12) and a second counter shaft (13) coaxial thereto which can be connected to the first counter shaft (12) by a second shifting clutch (b);
a first fixed gear (16) of a first gear set (I) is seated on the input drive shaft (10) and meshes with a first idler gear (23) on the first counter shaft (12); and
a second, fourth and seventh fixed gear (17, 19, 22) is seated on the intermediate shaft (14) from which the second fixed gear (17) engages with a third fixed gear (18) on the first counter shaft (12), while the fourth fixed gear (19) drives a second idler gear (24) and the seventh fixed gear, by means of an intermediate gear (28) drives a fifth idler gear (27) on the second counter shaft (13), upon which a third and a fourth idler gear (25, 26) are carried, and mesh with a fifth fixed gear (20) along with a sixth fixed gear (21) on the output shaft (11).

2. The transmission for a vehicle according to claim 1, wherein for the formation of a first to a fourth gear (1, 2, 3, 4) the flow of force is directed through the fourth gear set (IV) and for the formation of a fifth to an eighth gear (5, 6, 7, 8) said force is directed through the fifth gear set (V), and the flow of force in the first and fifth gear (1, 5) is directed through the third gear set III, the second and sixth gear (2, 6) is directed through the second gear set II, the fourth and eighth gear (4, 8) is directed through the first gear set (I), and in the third and seventh gear (3, 7) is directed through the first, second and third gear set (I, II, III) and in a ninth gear (9) the input shaft (10), by means of the intermediate shaft (14), is connected to the output shaft (11) through the first and sixth shifting clutches (a, f).

3. The transmission for a vehicle according to claim 1, wherein for the formation of a reverse gear (R) the force flow is conducted through a reverse gear set (W) and through the fourth or fifth gear set (IV, V).

4. The transmission for a vehicle according to claim 1, wherein the first gear set (I) has a gear ratio (i) of about 1.38, the second gear set (II) a ratio of 2.39, the third gear set (III) a ratio of 3.15, the fourth gear set (IV) a ratio of 0.35, the fifth gear set a ratio of 1.05 and the reverse gear set (W) has a gear ratio of 2.9, and a gear ratio i is defined as the ratio of a tooth count of the gear on the first or second counter shaft (12, 13), divided by a tooth count of the corresponding gears on the input shaft, the intermediate shaft and the output shaft (10, 14, 15).

* * * * *